Nov. 9, 1954

H. H. W. JOHNSON 2,693,719

KNEE ACTION AUTOMOTIVE VEHICLE CHASSIS
WITH INDEPENDENTLY DRIVEN WHEELS

Filed March 24, 1950

Herman H.W. Johnson
INVENTOR.

BY
Attorneys

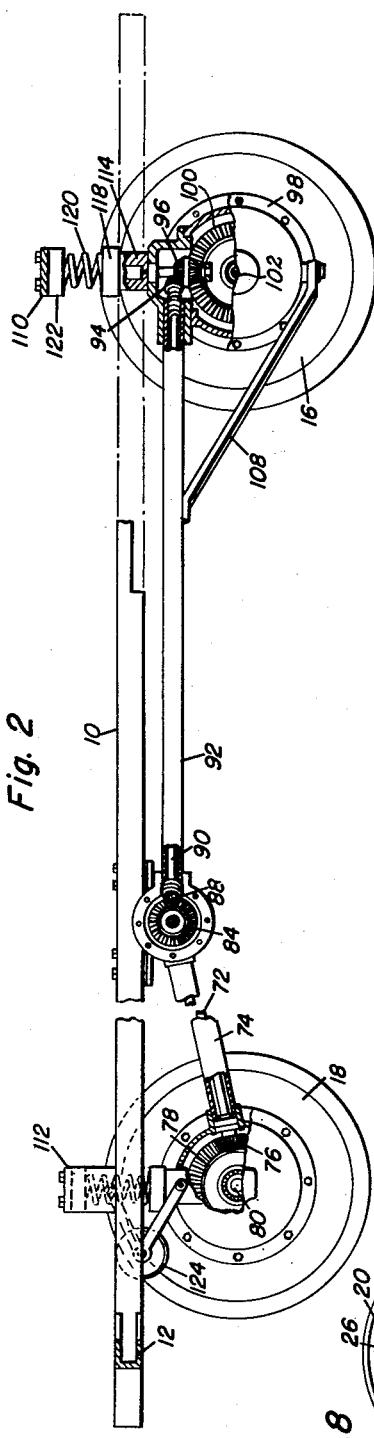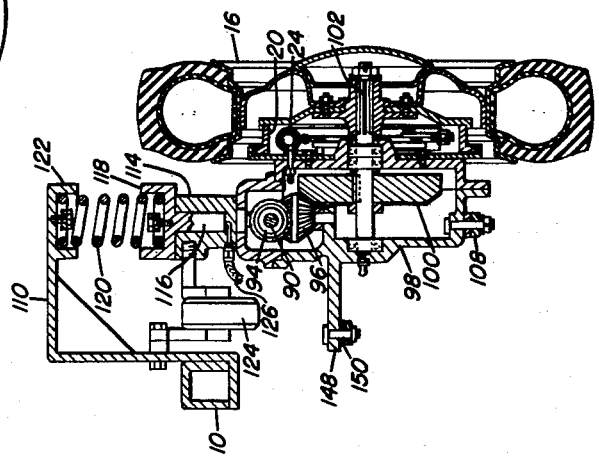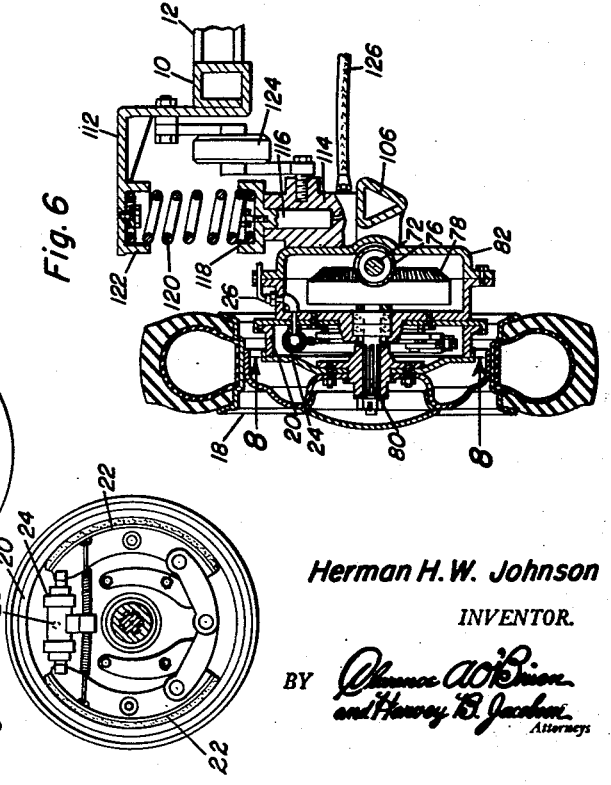

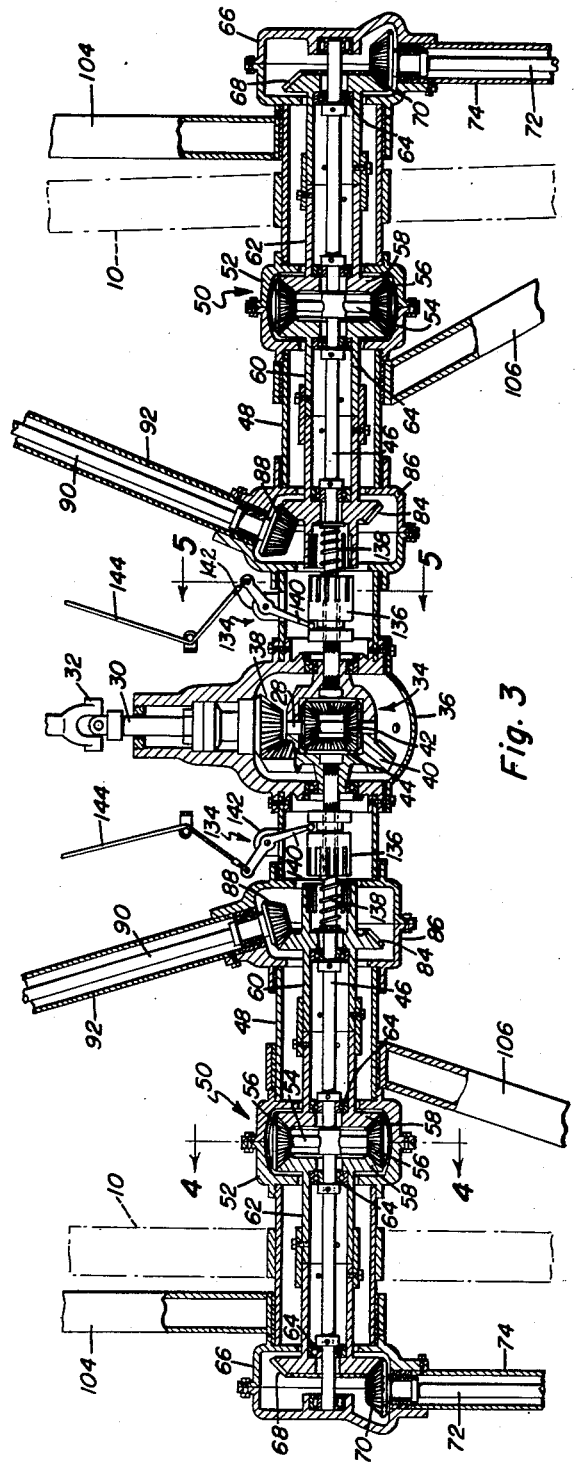

United States Patent Office 2,693,719
Patented Nov. 9, 1954

2,693,719

KNEE ACTION AUTOMOTIVE VEHICLE CHASSIS WITH INDEPENDENTLY DRIVEN WHEELS

Herman H. W. Johnson, Kramer, Nebr.

Application March 24, 1950, Serial No. 151,665

2 Claims. (Cl. 74—710)

This invention relates generally to a chassis construction for an automotive vehicle, in which the wheels are independently suspended and driven, special provision being made for the combination of the independent wheel suspension and driving means with means for raising and lowering the frame portion of the chassis relative to the wheels. This application is a continuation-in-part of my prior application Serial No. 10,531, filed February 24, 1948, now Patent No. 2,608,260.

The primary object of this invention is to provide cooperating structure enabling the independent suspension and driving of four wheels in an automotive vehicle, the locking of differentials in such manner as to allow the positive driving of each one of the wheels when necessary, and means for raising and lowering the frame portion of the chassis relative to the wheels when this is desirable.

The second important object of this invention is to provide novel differential drive structure involving the use of secondary differentials for each pair of wheels.

Another object of this invention is to provide drive means for the wheels without the use of universal joints, except possibly between the engine and a main differential.

Another object of this invention is to provide a chassis in which the front wheels can be steered while being driven, without involving complicated structure or universal joints in drive shafts leading to these wheels.

Still another object of this invention is to provide individual suspension and driving means in combination with a jack and shock absorber construction at each wheel.

The last object to be mentioned specifically is to provide a chassis construction which is relatively inexpensive and completely practicable to manufacture, which is safe, simple and convenient to use, and which will give generally efficient and durable service.

With these objects definitely in view, together with other objects of a specific type which will become apparent as the description proceeds, this invention resides in certain novel features of construction, combinations and arrangements of elements and portions as will be hereinafter described in detail in the specification, particularly pointed out in the appended claims, and illustrated in the accompanying drawings which form a material part of this application, and in which:

Figure 2 is a longitudinal vertical sectional view, taken substantially on the line 2—2 in Figure 1;

Figure 3 is an enlarged detail horizontal sectional view of the transverse shaft and the differential structures associated therewith, together with contiguous portions of the chassis;

Figure 4 is a vertical sectional view taken on the line 4—4 in Figure 3;

Figure 5 is a vertical sectional view taken substantially on the line 5—5 in Figure 3;

Figure 1:
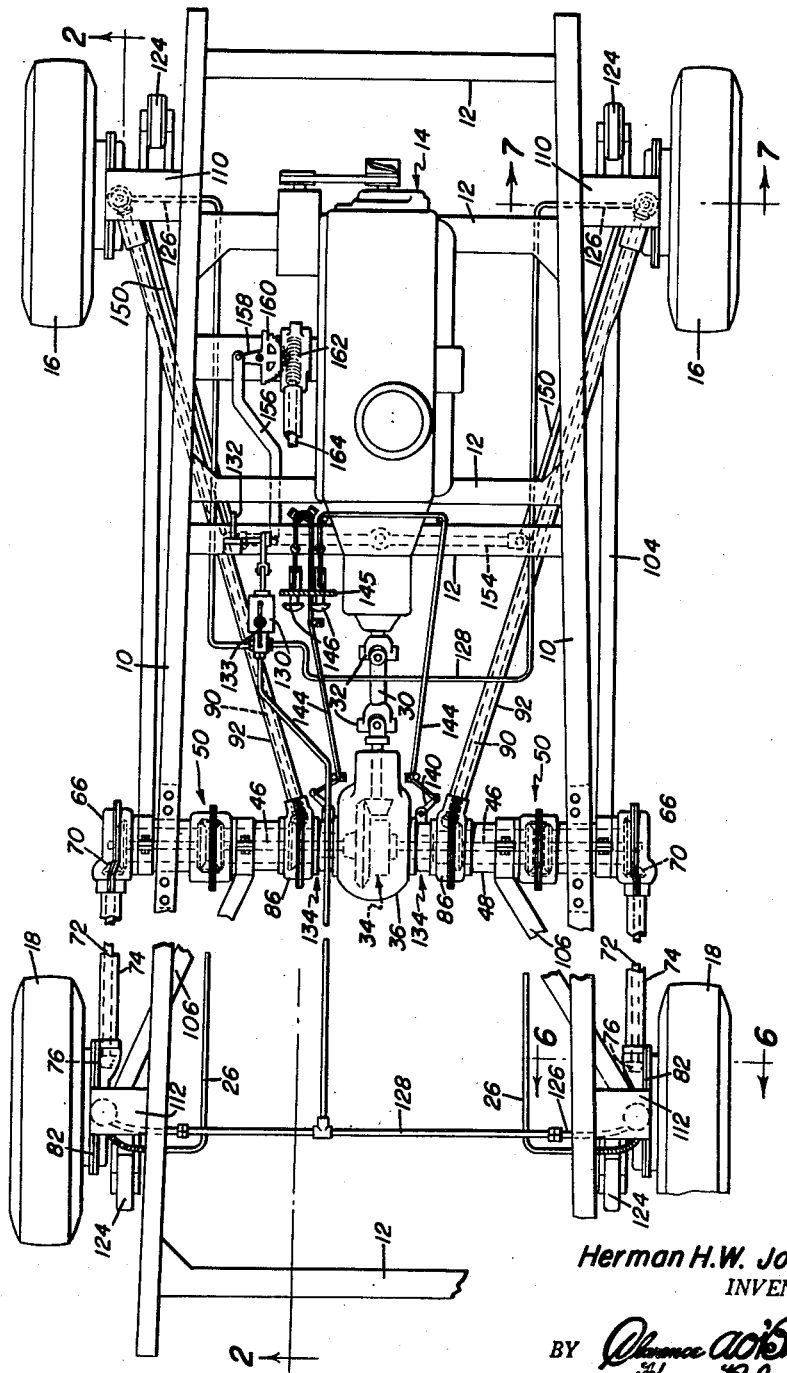
Figure 1 is a plan view of the assembled chassis, the view being broken and foreshortened to conserve space.

Figures 6 and 7 are vertical sectional views taken on the lines 6—6 in Figure 1 and on a corresponding line 7—7 through the rear wheel structure, and Figure 8 is an elevational view of the brake structure used with each wheel.

Similar characters of reference designate similar or identical elements and portions throughout the specification and throughout the different views in the drawings.

Referring now to the drawings in detail, the chassis includes longitudinal frame members 10 and cross frame members or braces 12, shown as five in number and spaced along the length of the frame. An engine 14 will be operatively mounted on certain of these cross members 12, as indicated in Figure 1, and the invention is illustrated as embodied in a chassis having four rubber tired wheels 16 and 18. Both the front wheels 16 and the rear wheels 18 are connected with service brake structure, each wheel being provided with a brake drum 20 and a pair of opposing brake shoes 22 operated by a hydraulic cylinder assembly 24 connected with hydraulic fluid brake line 26, and this brake structure is substantially conventional and while being illustrated in some detail in the drawings it is believed unnecessary to describe the same in detail. The brake lines will, of course, be connected to a master cylinder and brake pedal operator assembly of conventional character, these last-mentioned parts being not illustrated.

The engine 14 is connected by a main drive shaft 30, preferably including universal joints 32, when the engine is resiliently mounted on the cross members 12 of the frame, and the main drive shaft thus connects with what will be referred to as the main differential generally indicated at 34. If reference be had to Figure 3, this main differential will be seen to include a main differential housing 36, a main drive pinion 38, a crown gear 40 with a rotating housing portion carrying a pair of opposing differential pinions 42 on a cross shaft 28 carried by said rotating housing. A pair of transverse shaft drive gears 44 are arranged in opposed relation to drive a pair of transverse shaft sections 46 mounted within a housing 48 extending on each side of the main differential housing 36 and disposed transversely of the chassis. It will be understood that the gears mentioned herein will be bevel gears of any suitable character, although helical gears or other similar variants may be used.

A pair of secondary differentials, generally indicated at 50, are mounted within housings 52 supported at corresponding intermediate points in the housing 48. Each secondary differential includes a cross shaft 54 rigidly mounted on an intermediate portion of each transverse shaft section 46, and this cross shaft 54 carries bevel planet gears 56 continuously in mesh with a pair of opposing bevel gears 58. The bevel gears 58 are coaxially arranged on the transverse shaft sections 46 and these gears 58 are rigidly secured to hollow shafts 60 and 62 also arranged coaxially of the transverse shaft 46 and supported on bearing structure indicated at 64. The outwardly extending hollow shaft 62 terminates within housings 66, on each side of the chassis, and each hollow shaft 62 has another bevel gear 68 secured to its outer end. The gears 68 drive gears 70 affixed to rear wheel drive shafts 72 which are mounted within elongated housings 74 extending between and supported on the housings 66 and the rear wheel housing 82 which will be again mentioned. Gears 76 fixed on the rear ends of the rear wheel drive shafts 72 are in continuous engagement with ring bevel gears 78 fixed to short stub axles 80 which are splined to the rear wheels 18, the gears 76 and 78 being within the housing 82 which is supported as will hereinafter appear.

Referring now to the means for driving the front wheels, a pair of bevel gears 84 are rigidly secured to the inner ends of the hollow shafts 60, the gears 84 being housed within a housing 86, as are the bevel gears 88 which are rigidly secured to front wheel drive shafts 90 mounted within elongated housings 92 and terminating at their forward ends in pinion gears 94 which are in continuous engagement with the upper half portions of double bevel gear units 96, which latter are mounted to rotate about vertical axes in front wheel housings 98, the lower half of each double beveled gear unit 96 being in continuous engagement with a beveled ring gear 100 rigidly secured to short stub shaft 102 splined or otherwise connected to each front wheel 16.

It may be here noted that braces 104 are secured to the housings 48, one on each side of the chassis, the forward ends of these braces 104 being rigidly secured to the corresponding housings 92, it being understood that the housings 92 extend forwardly and outwardly from intermediate portions of the transverse shaft assembly toward the front wheel housings 98, the brace structure 104 being best illustrated in Figure 1 and Figure 3. Somewhat similar brace structure 106 extends on each side of the chassis rearwardly for connection to the rear wheel housing 82, this structure being best illustrated in Figures 3 and 6. Since the front wheels 16 must be steered, further brace structure 108 is secured to and between intermediate portions of the housings 92 and lower portions of the front wheel housings 98.

Aside from the longitudinal frame members 10 and cross members 12, the frame of the chassis also includes outwardly extending portions 110 adjacent the front wheels and similar portions 112 adjacent the rear wheels.

Each of the wheel housings 82 and 98 have integral upwardly extending cylinders 114 in which are operatively mounted pistons 116 having enlarged cup-shaped heads 118. Coil suspension springs 120 are seated within the cup-shaped heads 118 and extend upwardly for connection within opposing cup-shaped structures 122 on the outwardly extending portions 110 and 112 of the frame. Shock absorbers 124 which may be of substantially conventional character are operatively mounted with the arms thereof pivoted on opposing portions of the frame and corresponding adjacent portions of the cylinders 114, as will be clearly understood from an inspection of Figures 6 and 7. This construction, combined with the brace structure described hereinbefore provides for reasonable stability of the wheels while allowing vertical movement thereof relative to the frame, and the front wheels can, of course, be steered. Flexible tubes 126 are used to connect the cylinders 114 with pipes 128 leading to a source of pressurized fluid represented by the cylinder 130 in Figure 1, a piston within this cylinder being operatively connected with a pedal operator 132. This system is, of course, entirely separate from the brake system and allows the operator of the vehicle to raise and lower the frame relative to the wheels, by actuation of the pedal operator 132 and by allowing return flow of fluid in the system, it being understood that a check valve will be used to allow flow of fluid toward the cylinders 114 and that some suitable by-pass valve structure will be used to allow return flow past the check valve, as indicated at 133.

Disengageable lock means 134 are provided to allow the locking of the transverse shaft sections 46 with the inwardly extending hollow shafts 60, whereby the secondary differentials 50 may be selectively made inoperative to the extent that the front and rear wheels on either side of the chassis will be driven at the same rate and each driven positively without any differential action, in order that the operator of a vehicle with this invention incorporated thereon may prevent spinning of a wheel when the roadbed is slippery or otherwise unsuited for good traction. The disengageable lock means, on each side of the chassis, comprises a sleeve 136 splined on the transverse shaft section 46 adjacent one of said drive shaft housings 86 and urged in one direction by a spring 138, while a bellcrank 140 is pivoted on an adjacent portion 142 of the housing 48 and adapted to engage the sleeve 136 to move the same into operative engagement with the adjacent end of the inwardly extending hollow shaft 60, when the cable 144 is pulled. A complement of pulleys (unnumbered) will be suitably mounted on the chassis to guide the cables 144 to the instrument board 145 or other suitable location on the chassis, where the cables will be connected with operating push and pull controls 146.

The front wheel housings 98 will also be provided with steering arms 148 connected by inflexible links 150 with a rocker bar 154 which is pivoted on the fixed portion of the frame and connected by an inflexible link 156 with a lever 158 on a sector 160 which is driven by a worm 162 controlled by a steering wheel shaft 164. It will be understood that the steering mechanism described herein is particularly adaptable for use with this invention, although variations therein may be made without great alteration in the other elements described.

The operation of this invention has been described during the above specification of the mechanical details thereof and further description would appear to be unnecessary. It will be clear that all the objects mentioned above are amply achieved by the structure described and that a completely practicable and highly utilitarian chassis for automotive vehicles is herein disclosed.

In recapitulation it may be added that the independent suspension and drive connection for each wheel, with the means for locking the secondary differentials, combine with the means for raising and lowering the frame so that the chassis is made particularly well suited for use in military as well as civilian and commercial vehicles, especially where snow and mud are likely to be encountered.

Having described the invention, what is claimed as new is:

1. A differential drive mechanism for a motor vehicle comprising a differential housing having a drive shaft rotatably journaled therein and a drive pinion on said drive shaft, casing sections carried by said differential housing, drive shaft housings secured to the outer ends of said casing sections, other casing sections carried by said drive shaft housings, other differential housings secured to the outer ends of said other casing sections, still other casing sections carried by said other differential housings, other drive shaft housings secured to the outer ends of said still other casing sections, a pair of jack shafts extending from said first mentioned differential housings and having their outer ends journaled in said other drive shaft housings, said jack shafts being differentially connected to said drive pinion, a planet carrier secured to each of said jack shafts intermediate of their ends and disposed within each of said other differential housings, bevel gears being rotatably mounted on said jack shafts and disposed within said other differential housings in engagement with planet pinions mounted on said carriers, drive gears disposed in said first mentioned and said other drive shaft housings and connected to said bevel gears by hollow shafts, said hollow shafts being concentric to said jack shafts, drive shafts having pinions thereon in engagement with respective ones of said drive gears, said mechanism being secured directly to the chassis of a motor vehicle by means secured to said still another casing section.

2. The differential drive mechanism of claim 1, wherein said mechanism includes an internally splined tubular extension carried by certain of said drive gears, a sleeve slidably carried by each jack shaft within each of said first mentioned casing section, said sleeves having a splined connection with said jack shafts and being externally splined for engagement within said extensions, spring means carried by said jack shafts for urging said sleeves to inoperative positions, shift means carried by said first mentioned casing sections for moving said sleeves into engagement with said projections to lock said hollow drive shafts to said jack shafts.

References Cited in the file of this patent

UNITED STATES PATENTS

| Number | Name | Date |
|---|---|---|
| 1,468,338 | Wyman | Sept. 18, 1923 |
| 1,476,413 | Norgual | Dec. 4, 1923 |
| 1,522,509 | Girardelli | Jan. 13, 1925 |
| 1,648,753 | Bittner | Nov. 8, 1927 |
| 1,828,073 | Robinson | Oct. 20, 1931 |
| 1,858,781 | Masury | May 17, 1932 |
| 1,914,266 | Leupold | June 13, 1933 |
| 1,975,119 | Oates | Oct. 2, 1934 |
| 2,102,314 | Fraser | Dec. 14, 1937 |
| 2,126,960 | Highbee | Aug. 16, 1938 |
| 2,172,177 | Rose | Sept. 5, 1939 |
| 2,172,362 | Cole | Sept. 12, 1939 |
| 2,560,625 | Boggs, Jr., et al. | July 17, 1951 |
| 2,606,506 | Sloane | Aug. 12, 1952 |

FOREIGN PATENTS

| Number | Country | Date |
|---|---|---|
| 281,595 | Great Britain | Mar. 1, 1928 |
| 509,225 | Germany | Oct. 6, 1930 |